March 13, 1951 J. L. AASLAND 2,544,911
CONTROL FOR AGRICULTURAL FIELD
HARVESTING IMPLEMENTS
Filed March 27, 1947 2 Sheets-Sheet 1
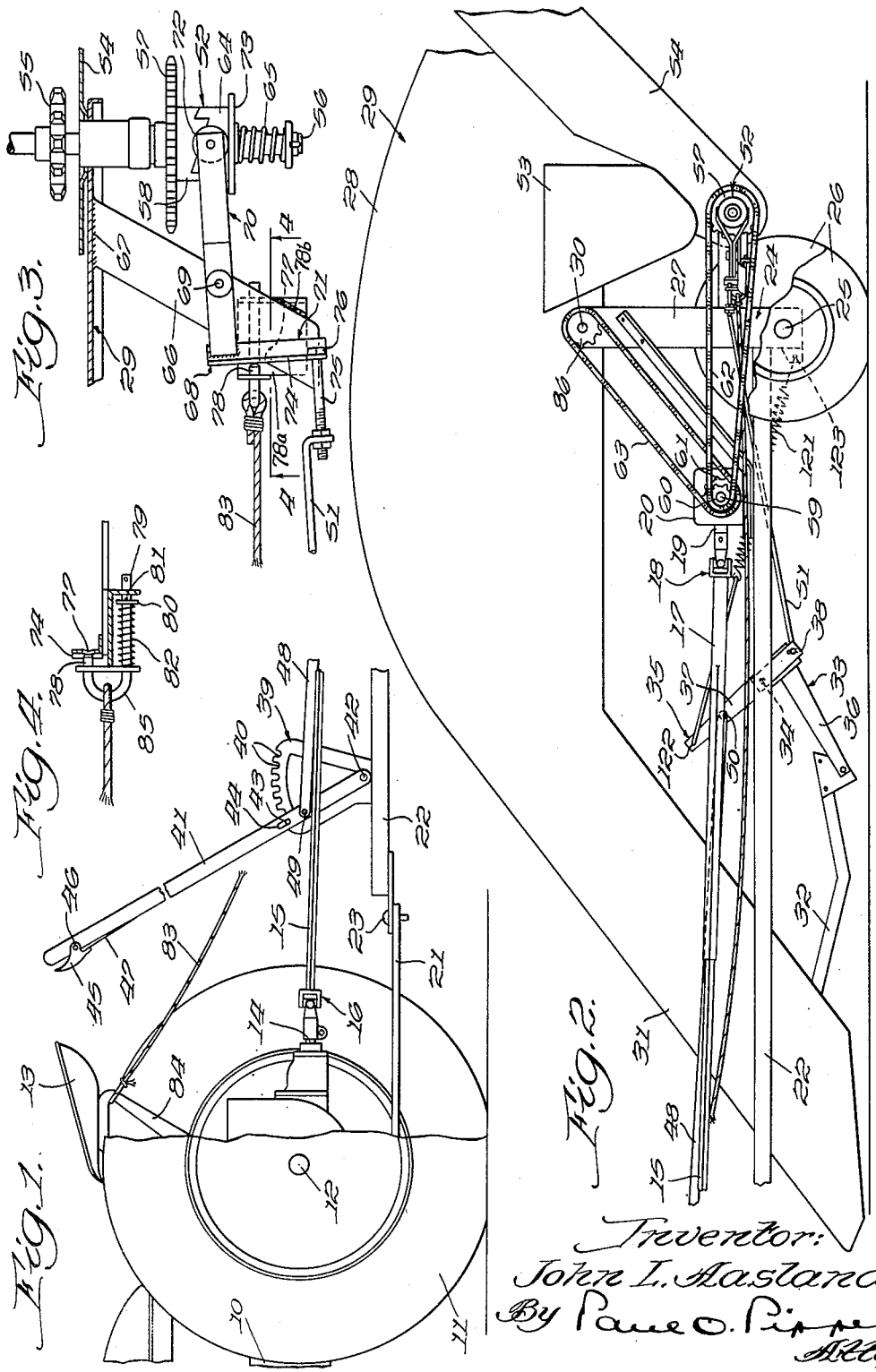
Inventor:
John L. Aasland.
By Paul O. Pinnel
Atty.

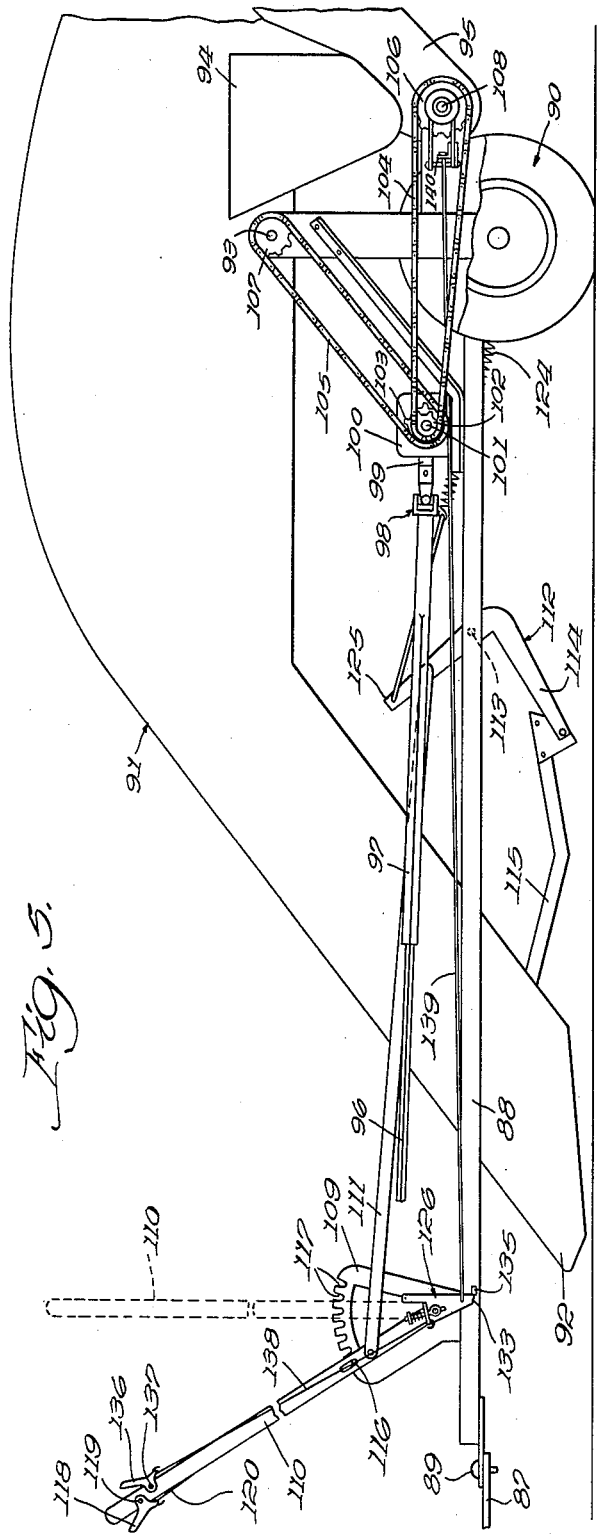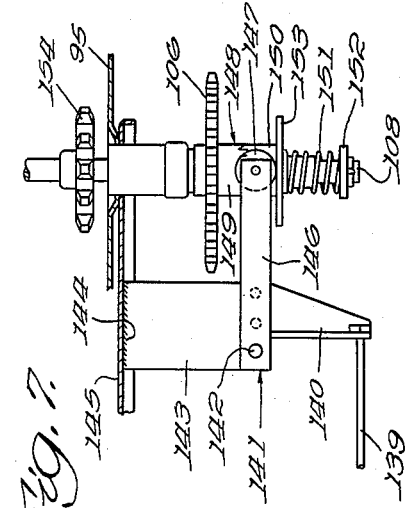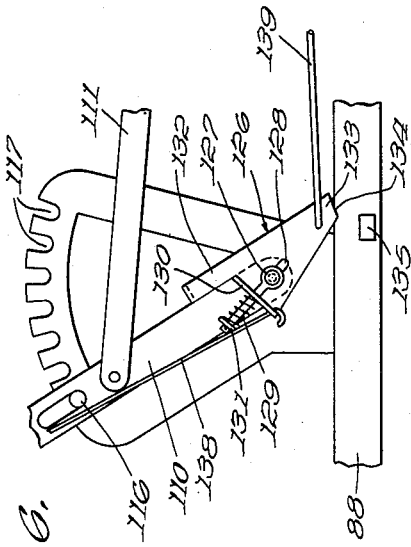

Patented Mar. 13, 1951

2,544,911

UNITED STATES PATENT OFFICE 2,544,911

CONTROL FOR AGRICULTURAL FIELD HARVESTING IMPLEMENTS

John L. Aasland, Moline, Ill., assignor to International Harvester Company, a corporation of New Jersey Application March 27, 1947, Serial No. 737,679

4 Claims. (Cl. 56—10)

This invention relates to new and improved controls for agricultural field harvesting implements and has for one of its principal objects the provision of means for automatically disengaging a wagon elevator drive when the forward end of the implement is raised at the end of a row to effect turning thereof.

An important object of this invention is to provide control means for corn picking machines wherein the raising of the corn gathering points automatically effects disengagement of a clutch controlling the drive of the wagon elevator associated with the corn picker.

Another important object of this invention is to provide an automatic clutch throwout of corn picker discharge elevators upon raising of the gathering points and in combination therewith requiring a manual release for reengagement of the clutch after the gathering points have been lowered.

A further object of this invention is to provide a latch mechanism associated with a throwout clutch which effects a locking of the clutch in disengaged position and which latch must be manually released to effect reengagement of the clutch elements.

A still further object of this invention is to provide a control lever for corn pickers or the like which causes raising and lowering of the corn gathering units and simultaneously effects a disengagement of an associated wagon elevator upon raising of the points but is prevented by releasable latch means associated with the lever from causing reengagement of the clutch when the gathering points are lowered.

Other and further important objects of this invention will become apparent from the disclosures in the following specification and accompanying drawings in which:

Figure 1 is a partial side elevational view of the device of this invention;

Figure 2 is a side elevational view forming a continuation of the view shown in Figure 1;

Figure 3 is a top plan view of the clutch throwout mechanism as employed in the device shown in Figure 2;

Figure 4 is a sectional view taken on the line 4—4 of Figure 3;

Figure 5 is a side elevational view of a modified form of this invention;

Figure 6 is an enlarged detail of a portion of the device as shown in Figure 5; and Figure 7 is a top plan view of the clutch throwout mechanism as employed in the device of Figure 5.

As shown in the drawings:

The reference numeral 10 indicates generally a longitudinally extending narrow body chassis of an agricultural type tractor. The rear of the tractor is equipped with relatively large widely spaced traction wheels 11 mounted on an axle 12. A seat 13 is provided for the tractor operator and the controls for trail-behind field implements are positioned closely adjacent this operator's seat.

A power take-off shaft 14 is provided at the rear of the tractor and a drive shaft 15 connected by a universal joint 16 to the power take-off shaft 14 carries the rotational drive rearwardly, as best shown in Figure 2, through a telescoping sleeve 17 over the drive shaft 15 and to a universal joint 18. The drive shaft 15 and sleeve 17 have corresponding cross-sectional shapes to effect a carrying of rotational drive from one to the other. The telescoping of the drive shaft 15 within the sleeve 17 also permits variations in the spacing of the tractor and trail-behind implement. The universal joint 18 is connected at its other side to a shaft 19 which imparts rotational drive into a gear housing 20.

The tractor is provided with a draw-bar 21 at its rear and is adapted to receive forwardly extending hitch frames from trail-behind implements. A hitch frame 22 of a trail-behind corn picker and harvester is shown resting on the draw-bar 21 and having a pin 23 locking the two members together. As best shown in Figure 2, the hitch frame 22 extends rearwardly to its point of rigid connection with a wheeled truck 24. The truck 24 is provided with a transverse axle 25 and spaced wheels 26 preferably having pneumatic tires. A vertical post member 27 is affixed to the wheeled truck 24 and at its upper end pivotally carries the rear portion 28 of the corn harvester 29 about the shaft 30. The forward portion or harvester units and gathering points 31 are supported by a vertically adjustable member 32. A bell-crank 33 is pivoted at 34 on the hitch frame 22 and consists of arms 35 and 36. The arm 36 directly engages the lifting member 32 and hence upon rotation of the bell-crank 33 about its pivot 34, the gathering points 31 of the corn picker 29 are raised or lowered. The pivot point 34 is positioned intermediate the ends of the arm 35, thereupon dividing that arm into an upper portion 37 and a lower portion 38.

A quadrant 39 is fixedly mounted on the hitch frame 22 at the forward end thereof. The upper surface of the quadrant is provided with a plurality of notches 40. A hand lever 41 is pivotally attached to the quadrant 39 at 42 and is provided with a vertically movable latch member 43 adapted to engage the notches 40 and thereupon hold the lever in any desired position. The latch 43 moves vertically in an elongated slot 44. Movement of the latch is effected by a hand lever or latch operator 45 pivotally mounted at 46 in the upper end of the lever arm 41. The link 47 extends downwardly from the hand lever 45 to the latch member 43 and imparts movement from the hand lever to the latch. When the hand lever 45 is compressed against the lever 51, the latch 43 is drawn upwardly in the slot 44, thus permitting the latch to move over the top of the quadrant and upon release thereof the latch 43 will engage the nearest notch 40.

A rigid link 48 is pivotally attached at 49 to the lever arm 41 and extends rearwardly as shown in Figures 1 and 2 to a pivotal connection at 50 on the upper portion 37 of the bell crank arm 35. The hand lever 41 is positioned relatively close to the tractor operator, who sits in the seat 13, and when he desires to raise the gathering points he moves the lever 41 rearwardly over the quadrant 49 thus pushing rearwardly on the outwardly extending portion 37 of the arm 35 causing the lower portion 38 of the arm and the other bell crank arm 36 to move forwardly. The bell crank arm 36, in addition to moving forwardly moves upwardly so that the gathering points are raised by reason of the intermediate member 32. In order to make the operator's job of raising the gathering points easier, a counterbalancing spring 121 joins the upper end of the bell crank lever arm 35 at 122 to a rigid support on the wheeled truck at 123. The weight of the corn picker gathering points is therefore considerably offset by the action of the spring tending to lift the points and assist the operator when he is moving the operating lever 41 rearwardly. Simultaneously with the operator moving the lever 41 rearwardly, a link 51 attached to the lower portion 38 of the arm 35 moves forwardly causing disengagement of the clutch 52.

The rear end of the trail-behind corn picker is equipped with a receiving hopper 53 and a wagon or discharge elevator 54. The wagon elevator 54 is driven by the sprocket 55 as shown in Figure 3 and is adapted to elevate harvested ears of corn through the elevator 54 where they are deposited in a wagon or other receptacle. The clutch 52 is mounted on the transverse shaft 56. A sprocket 57 is fastened to one of the clutch members 58 which is journaled over the transverse shaft 56. As best shown in Figure 2, a shaft 59 is driven from the tractor power take-off through the gear box 20. Sprockets 60 and 61 are keyed or otherwise fastened to the shaft 59 and by means of chains 62 and 63 rotational drive from the tractor power take-off is imparted to the several elements of the corn picker harvester. The chain 62 extends around sprockets 57 and 60 and thus rotational drive is given to the clutch element 58. A cooperative clutch element 64 is splined or otherwise fastened to the shaft 56 for movement longitudinally of the shaft toward and away from the other clutch element 58. A spring 65 tends to normally maintain the clutch elements 58 and 64 together and thus drive from the sprocket 57 is imparted to the shaft 56 and thereupon to the elevator driving sprocket 55.

A structural frame member 66 is welded or otherwise fastened at 67 to the side walls of the corn picker 29. A bell crank member 68 is pivoted at 69 on the frame member 66 and comprises arms 70 and 71. The arm 71 is joined by the link 51 previously stated to be attached to the lower extension 38 of the bell crank arm 35. As the link 51 moves forwardly the extreme end of the arm 70 moves outwardly away from the side walls of the corn picker. The arm 70 is provided with a roller 72 which is adapted to engage a flange 73 mounted integrally with the clutch element 64. The fact that there is no rigid connection between the roller 72 and the clutch element 64 makes it possible for the bell crank arm 70 to effect disengagement of the clutch element 64 from the elements 58 through the small arcuate movement occasioned by its pivotal movement about the pin 69.

The bell crank arm 71 is in the form of an angle member having an upwardly extending flange 74 to which is attached the link 51 through the medium of a bolt 75. The bolt head 76 is positioned on the inside of the flange 74 and thus forward movement of the link 51 causes a corresponding forward movement of the bolt 75. The bolt passes through an opening in the flange 74 sufficient so that the bolt shank may readily slide therethrough. Spaced from the attachment of the bolt to the flange 74 is an opening 77 in the flange which is for the purpose of receiving a locking pin 78 as best shown in Figures 3 and 4. When the lever 41 is moved rearwardly, the link 51 moves forwardly as previously stated swinging the bell crank 68 about its pivot 69. The hole 77 in the flange 74 becomes alined with the locking pin 78 at a time when the clutch elements 58 and 64 are completely separated. The locking pin 78 is C-shaped, as shown in Figure 4, and the lower arm 79 is provided with a collar 80 fixedly held by a pin 81 and having a surrounding spring 82 which normally tends to move the collar and thus the entire locking pin 78 in a rightward direction, as viewed in Figure 4, thus causing the pin 78 to engage the aperture 77. The pin 78 is journally mounted in a plate member 78ª which is welded as shown at 78ᵇ to the fixed member 66. The member 66 and the plate 78ª are thus integral parts of the supporting frame of the harvesting machine.

When the gathering points are lowered by a forward movement of the lever 41, the link 51 moves rearwardly but does not cause a reengagement of the clutch elements 58 and 64 for the reason that the bolt 75 merely slides through the enlarged aperture in the flange 74 without forcing the bell crank 68 to rotate about its pivot 69. It will thus be seen that although the gathering points are now in position for resuming gathering and picking operation, the wagon elevator is not functioning. In turning a corn picker at the end of rows of corn being picked, the first operation is to raise the gathering points and to begin turning the implement. The forward portion of the machine arrives in its about-face direction considerably prior to the final arriving of the wagon elevator to a straight line position with respect to the front of the corn picking implement. Hence, it is desirable to postpone wagon elevator operation until such time as the wagon is positioned beneath the elevator. The operator of this tractor trailing corn picker need only raise his points to effect disengagement of the wagon elevator drive when turning the implement around. However, when he resumes picking corn he does not start his wagon elevator until such time as the wagon is in proper position beneath the discharge portion of the wagon elevator. A flexible cable or rope 83 has its forward portion removably fastened to the seat post 84 of the tractor and extends rearwardly to a fixed attachment with the bight portion 85 of the locking pin 78. The operator after turning waits until such time as the wagon is in a straight line relationship with the implement and then pulls on the rope 83 causing the locking pin 78 to become disengaged from the aperture 77 in the flange 74 of the bell crank arm 71 and immediately permitting the spring 65 to move the clutch element 64 into reengagement with the clutch element 58, whereupon drive from the power take-off shaft to the wagon elevator is resumed.

The chain 63 carries drive from the sprocket 61 upwardly to a sprocket 86 mounted on the pivot shaft 30 of the entire corn picker 29. The remaining elements of the corn picker receive their drive from the jack-shaft 30 which is driven by the chain 63.

A modified construction of the corn picker controls of this invention is shown in Figures 5, 6 and 7. A tractor draw-bar is shown at 87 and a hitch frame 88 is shown attached thereto by a pin 89 corresponding to the pin 83 shown in Figure 1. The trailing implement frame 88 is supported at its rear end by a wheeled truck 90. A corn picker 91 having gathering points 92 at the forward end thereof is pivoted at its rear about the shaft 93 which is fixedly supported on and above the wheeled truck 90. The corn picker 91 is adapted to snap the ears of corn from their stalks and deposit the snapped ears in a hopper 94 which communicates with a wagon elevator 95 for conveying the snapped ears from the implement to a trailing wagon or other receptacle. The corn picker mechanisms are operated by a power take-off from a tractor drawing the implement such as shown in Figure 1. A driving shaft 96 is shown telescoping a correspondingly shaped sleeve 97 which carries the rotational drive from the tractor take-off to a universal joint 98. A driving shaft 99 thereupon imparts drive from the universal joint 98 to a gear box 100. This gear box contains gearing, not shown, to effect rotational drive of the transverse shaft 101 extending laterally from the gear box 100 at right angles to the input shaft 99. Sprockets 102 and 103 are keyed or otherwise fastened to the shaft 101 and by means of chains 104 and 105 the sprockets 106 and 107 are rotatably driven. The sprocket 106 is fastened to a shaft 108 which carries the drive to the wagon elevator 95. The sprocket 107 is mounted on the jack-shaft 93 about which the corn picker pivots and the picker elements receive their drive from this shaft 93.

A quadrant 109 is fixedly mounted near the forward end of the implement frame 88 and has pivotally attached thereto an operating lever 110. This lever corresponds to the lever 41, shown in Figure 1, and by reason of the connecting link 111 rearward swinging of the operating lever 110 causes a rotational movement of the bell crank lever 112 about its pivotal attachment 113 on the frame 88, thus causing a raising of the bell crank arm 114 and thereupon the lifting link 115 which engages the underside of the gathering points 92 and raises them with respect to the ground about the pivot shaft 93. As in the case with the lever 41 the operating lever 110 is equipped with a latch pin 116 which engages the notches 117 in the upper surface of the quadrant 109 to maintain the lever in fixed position with respect to the quadrant. A hand engaging lever 118 pivotally attached at 119 at the upper end of the operating lever 110 joins with the latch pin 116 by a connecting rod 120 and arranged and constructed in such a manner that movement of the hand lever 118 toward the operating lever 110 will cause an upward movement of the latch pin 116 and thus permit swinging movement of the operating lever 110 over the upper surface of the quadrant 109. When the lever 110 is in the desired position the hand lever 118 is released, thus permitting the latch pin 116 to engage the notch 117 nearest it in that position. The lever 110 is shown in a rearwardly swung position in dashed lines in Figure 5. Raising of the gathering points 92 is facilitated by a counterbalancing spring 124 corresponding to the spring 121. The spring 124 extends between the upper end of the arm 125 of the bell crank lever 112 and a rigid connection on the wheeled truck 90, thus tending to cause a clockwise rotational movement of the bell crank lever 112 about its pivot 113 as viewed in Figure 5. Such a movement assists the operator in raising the gathering points.

During the corn picking operation of the implement, the operating lever 110 is in the position as shown in Figure 6. At the lower end of the operating lever a latch member 126 is attached for separate pivotal movement about the pin 127. An elongated slot 128 is provided in this latch member 126 and a spring 129 normally tends to exert a downward force against an outwardly turned flange 130 on the latch 126. The spring is retained by a collar 131 and reacts downwardly against the latch 126 maintaining the pin 127 in the upper end of the elongated slot 128. As the operating lever 110 is moved rearwardly to the dashed line position, as shown in Figure 5, it carries with it the latch member 126 by reason of the upward extension 132 which contacts the rearward face of the operating lever 110. The latch 126 then assumes the position, as shown in Figure 5, with its lower end 133 positioned behind a stop member 135. As the operating lever 110 moves rearwardly, the latch 126 slides upwardly by reason of its lower inclined surface 134 in the slot against the action of the spring 129 and immediately upon passing over the stop 135, the latch is moved downwardly by the spring 129 causing the rear face of the latch 126 to become locked forwardly of the stop. A second latch operating lever 136 is pivotally attached to the upper end of the operating lever 110 at 137 and is adapted to pull upwardly on a connecting rod 138 when the hand latch lever 136 is compressed against the operating lever 110, thus causing an upward movement of the latch member 126 inasmuch as the connecting rod 138 is attached to the outwardly extending flange 130 of the latch member 126.

A link 139 engages the lower end of the latch 126 and extends rearwardly to a laterally extending arm 140 of a bell crank lever 141 which is pivotally attached at 142 to a supporting arm 143 welded or otherwise fastened at 144 to the side walls 145 of the corn picker 91. The bell crank lever 141 has a longitudinally extending arm 146 journally supporting a roller 147 at its rear end.

A clutch 148 having elements 149 and 150 are normally maintained in driving relationship by the spring 151 reacting against a collar 152 fixedly mounted on the shaft 108. The sprocket 106 is fixedly attached to the sleeve clutch element 149 and thus imparts drive to the shaft 108 through the other clutch element 150 which is splined for driving and sliding movement with respect to the shaft 108. The clutch element 150 has an enlarged collar 153 against which the roller 147 actuates, causing separation of the clutch elements 149 and 150 when the bell crank lever 141 is rotated about its axis of rotation 142. The shaft 108 carries a driving sprocket 154 for operation of the wagon elevator endless conveyor not shown.

It will be apparent therefore that as the gathering points 92 are raised, the drive for the wagon elevator is disengaged through the separation of the clutch elements 149 and 150. These clutch elements remain separated, as shown in Figure 5, when the latch 126 is locked forwardly of the stop 135. In Figure 5 the gathering points have been lowered but the wagon elevator has not yet resumed operation. As stated above in describing the operation of the preferred form, it is desired to withhold operation of the wagon elevator after the lowering of the gathering points until such time as the trailing wagon becomes alined with the discharge spout of the wagon elevator. At this time the hand lever effecting operation of the latch member 126 is pulled against the operating lever 110 causing an upward movement of the latch 126 so that the pin 127 moves downwardly into the elongated slot 128, permitting the spring 151 in the clutch 148 to move the clutch members 149 and 150 together and thus force the bell crank lever 141 in a counterclockwise movement about its pivot 142, as viewed in Figure 7, thus causing reengagement of the wagon elevator drive.

The operation of both of the devices shown is quite similar. Both of them perform the function of automatically disengaging the operation of the wagon elevator upon raising of the gathering points, but both provide that the wagon elevator shall not be automatically reengaged and reengagement of the elevator drive must be by manual action of the operator. In the device, as shown in Figures 1 to 4, the manual operation takes the form of pulling on the actuating cable or rope 83, whereas in the device of Figures 5 to 7 the reengagement of the elevator drive is accomplished by compressing the hand lever 136 on top of the main operating lever 110.

Many details of construction may be varied throughout a wide range without departing from the principles disclosed herein and I therefore do not propose limiting the patent granted hereon otherwise than as necessitated by the appended claims.

What is claimed is:

1. In a field harvesting machine including a supporting frame, one portion of said machine having vertically adjustable means to harvest field crops and another portion of said machine having conveyor means on the supporting frame to discharge harvested crops, means for driving said conveyor means, a spring-held clutch in said driving means, a first bell crank pivotally mounted on said supporting frame and having one arm thereof arranged and constructed to raise and lower said harvester portion, a second bell crank pivotally mounted on said supporting frame having one arm thereof arranged and constructed to disengage the spring-held clutch in said conveyor driving means, a lever hingedly mounted on said supporting frame, connecting rods joining said lever and the other arms of each of said pivotally mounted bell cranks and said connecting rods constructed and arranged to effect rotation of said bell cranks through a certain direction of rotation upon swinging of said lever through a predetermined direction, a latch arranged and constructed to hold said second bell crank immovable upon its attainment of a predetermined position, and said lever arranged and constructed to rotate only the first of said bell cranks in the opposite direction upon swinging movement of said lever in an opposite direction, and means for causing rotation of the second of said bell cranks in the opposite direction.

2. In a field harvesting machine including a supporting frame, one portion of said machine having vertically adjustable means to harvest field crops and another portion of said machine having conveyor means on the supporting frame to discharge harvested crops, means for driving said conveyor means, a spring-held clutch in said driving means, a first bell crank pivotally mounted on said supporting frame and having one arm thereof arranged and constructed to raise and lower said harvester portion, a second bell crank pivotally mounted on said supporting frame having one arm thereof arranged and constructed to disengage the spring-held clutch in said conveyor driving means, a lever hingedly mounted on said supporting frame, connecting rods joining said lever and the other arms of each of said pivotally mounted bell cranks and said connecting rods constructed and arranged to effect rotation of said bell cranks through a certain direction of rotation upon swinging of said lever through a predetermined direction, a latch arranged and constructed to hold said second bell crank immovable upon its attainment of a predetermined position, and said lever arranged and constructed to rotate only the first of said bell cranks in the opposite direction upon swinging movement of said lever in an opposite direction, and means for causing rotation of the second of said bell cranks in the opposite direction, said last named means including means for retracting said latch, whereby the clutch reengages by action of its spring.

3. In a field harvesting machine including a supporting frame, one portion of said machine having vertically adjustable means to harvest field crops and another portion of said machine having conveyor means on the supporting frame to discharge harvested crops, means for driving said conveyor means, a spring-held clutch in said driving means, a first bell crank pivotally mounted on said supporting frame and having one arm thereof arranged and constructed to raise and lower said harvester portion, a second bell crank pivotally mounted on said supporting frame having one arm thereof arranged and constructed to disengage the spring-held clutch in said conveyor driving means, a lever hingedly mounted on said supporting frame, connecting rods joining said lever and the other arms of each of said pivotally mounted bell cranks and said connecting rods constructed and arranged to effect rotation of said bell cranks through a certain direction of rotation upon swinging of said lever through a predetermined direction, a latch arranged and constructed to hold said second bell crank immovable upon its attainment of a predetermined position, and said lever arranged and constructed to rotate only the first of said bell cranks in the opposite direction upon swinging movement of said lever in an opposite direction, means for causing rotation of the second of said bell cranks in the opposite direction, said last named means including means for retracting said latch, whereby the clutch reengages by action of its spring, said latch directly associated with said second bell crank lever and having a spring-held locking pin adapted to engage alined apertures in said bell crank and said frame, and said means for retracting said locking pin including a cable.

4. In a field harvesting machine including a supporting frame, one portion of said machine having vertically adjustable means to harvest field crops and another portion of said machine having conveyor means to discharge harvested crops, means for driving said conveyor means, a spring-held clutch in said driving means, a first bell crank pivotally mounted on said frame and having one arm thereof arranged and constructed to raise and lower said harvester portion, a second bell crank pivotally mounted on said frame having one arm thereof arranged and constructed to disengage the spring-held clutch in said conveyor driving means, a lever hingedly mounted on said supporting frame, connecting rods joining said lever and the other arms of each of said pivotally mounted bell cranks and said connecting rods constructed and arranged to rotate said bell cranks in one direction upon swinging of said lever in one direction, a latch arranged and constructed to hold said second bell crank immovable upon its attainment of a predetermined position, and to permit rotation of only the first bell crank in the opposite direction upon swinging movement of said lever in the opposite direction, means for causing rotation of the second of said bell cranks in the opposite direction, said last named means including means for retracting said latch, whereby the clutch reengages by action of its spring, said latch pivotally associated with said hinged lever and having an elongated slot therein, a stop mounted on said frame, spring means for normally urging said latch in an extended position behind said stop when the second bell crank is in its predetermined position, and said means for retracting the latch including a rod extending from the latch to the top of the lever and arranged to pull said latch upwardly in said elongated slot.

JOHN L. AASLAND.

REFERENCES CITED

The following references are of record in the file of this patent:

UNITED STATES PATENTS

| Number | Name | Date |
|---|---|---|
| 958,710 | Biggert, Jr. | May 17, 1910 |
| 972,910 | Pippen | Oct. 18, 1910 |
| 1,346,322 | Lewis et al. | July 13, 1920 |
| 1,821,543 | Coultas | Sept. 1, 1931 |
| 2,149,262 | Ahler | Mar. 7, 1939 |
| 2,255,168 | Hyman et al. | Sept. 9, 1941 |